(12) United States Patent
Inskip et al.

(10) Patent No.: US 8,407,747 B1
(45) Date of Patent: Mar. 26, 2013

(54) ADAPTIVE TRICK PLAY STREAMING

(75) Inventors: Thomas Inskip, Kirkland, WA (US);
Duncan MacLean, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/419,048

(22) Filed: Mar. 13, 2012

(51) Int. Cl.
*H04N 7/173* (2011.01)

(52) U.S. Cl. .................. 725/90; 725/88; 725/94; 386/68

(58) Field of Classification Search ................. 725/88, 725/90, 94, 99; 386/68
See application file for complete search history.

(56) References Cited

U.S. PATENT DOCUMENTS

| | | | | |
|---|---|---|---|---|
| 6,064,794 A * | 5/2000 | McLaren et al. | ............... | 386/343 |
| 6,654,539 B1 * | 11/2003 | Duruoz et al. | ................ | 386/343 |
| 6,965,724 B1 * | 11/2005 | Boccon-Gibod et al. | ..... | 386/344 |
| 7,096,271 B1 * | 8/2006 | Omoigui et al. | .............. | 709/231 |
| 7,237,254 B1 * | 6/2007 | Omoigui | ......................... | 725/94 |
| 7,240,162 B2 | 7/2007 | de Vries | | |
| 7,472,198 B2 * | 12/2008 | Gupta et al. | .................. | 709/231 |
| 7,720,350 B2 * | 5/2010 | Surline | .......................... | 386/343 |
| 2003/0147561 A1 * | 8/2003 | Faibish et al. | ................. | 382/245 |
| 2003/0231863 A1 * | 12/2003 | Eerenberg et al. | ............. | 386/68 |
| 2005/0155072 A1 * | 7/2005 | Kaczowka et al. | ............. | 725/95 |
| 2005/0267948 A1 * | 12/2005 | McKinley et al. | ........... | 709/217 |
| 2006/0029372 A1 * | 2/2006 | Barrett et al. | ................ | 386/111 |
| 2006/0117357 A1 * | 6/2006 | Surline | ........................... | 725/90 |
| 2006/0294128 A1 | 12/2006 | Gottschalk | | |
| 2007/0097816 A1 | 5/2007 | Van Gassel | | |
| 2007/0133942 A1 * | 6/2007 | Moors et al. | ................... | 386/68 |
| 2007/0140647 A1 * | 6/2007 | Kusunoki et al. | ............... | 386/68 |
| 2008/0104644 A1 * | 5/2008 | Sato et al. | ........................ | 725/90 |
| 2008/0148327 A1 * | 6/2008 | Xu | ................................. | 725/105 |
| 2010/0135382 A1 * | 6/2010 | Kim et al. | ................ | 375/240.01 |
| 2010/0235542 A1 | 9/2010 | Visharam et al. | | |
| 2012/0059951 A1 | 3/2012 | Gutarin et al. | | |

OTHER PUBLICATIONS

Wes Simpson, "DASHing for a Streaming Standard," TVTechnology, http://www.tvtechnology.com/article/dashing-for-a-streaming-standard/210842, dated Nov. 21, 2011.
"Adaptive bitrate streaming," Wikipedia, http://en.wikipedi.org/wiki/Adaptive_bitrate_streaming, printed from the World Wide Web on Feb. 29, 2012.
A. Lilleste and L. Lundgren, "Media Streaming for Infotainment," Chalmers University of Technology, Department of Computer Science and Engineering, Jun. 2009.
Office Action from U.S. Appl. No. 13/419,041, dated Jul. 5, 2012.

* cited by examiner

*Primary Examiner* — Pankaj Kumar
*Assistant Examiner* — Mulugeta Mengesha
(74) *Attorney, Agent, or Firm* — McDonnell Boehnen Hulbert & Berghoff LLP

(57) ABSTRACT

Methods and devices for controlling trick-play video streaming. Upon receipt of a request to play video at a fast-play (e.g., fast-forward or fast-reverse) speed that is some multiple of a normal playback speed, one of multiple possible frame-rate versions of a trick-play track may be selected based on the requested fast-play speed and an available network bandwidth, and a server may stream the selected frame-rate version of the trick-play track to a client for playout. The various frame-rate versions may differ from each other in terms of a rate at which they skip I-frames of the video.

29 Claims, 7 Drawing Sheets

ADAPTIVE TRICK PLAY STREAMING

BACKGROUND

Unless otherwise indicated herein, the materials described in this section are not prior art to the claims and are not admitted to be prior art by inclusion in this section.

With advances in networking and computing technology, it is now commonplace for client devices to receive and play out video being streamed in real time from a network server. In practice, for instance, a client may be programmed or otherwise arranged with a media player that provides a user interface at which the client can receive a user request for streaming playout of particular video. The media player may then cause the client to interact with a server according to an agreed protocol (such as the Hypertext Transfer Protocol (HTTP), the Real Time Streaming Protocol (RTSP), the Real-time Transport Protocol (RTP), the Real Time Control Protocol (RTCP), and the Real Time Messaging Protocol (RTMP)), to request the server to stream the particular media. As the client receives the video streamed in response from the server, the client may then play out the video at the user interface for the user's enjoyment.

To facilitate streaming of video over a network for playout at a requesting client, the video may be digitized and encoded using a particular coder-decoder (codec) so as to produce an encoded bit stream, and the server may divide the encoded bit stream into sequence of blocks and encapsulate each block with a numbered header such as an RTP header for instance. The server may then transmit the sequence of encapsulated blocks to the client using a network protocol such as the Internet Protocol (IP) for instance. As the client receives the encapsulated blocks of the encoded bit stream, the client may then combine the blocks into their original encoded bit stream and buffer the bit stream in data storage. From the buffer, the client may then use the codec to decode the bit stream and may play out the resulting original video at the user interface.

In practice, the media player may enable the user to request playout of the video in a fast-forward mode, i.e., at a fast-forward speed that is some multiple of its normal playout speed. To facilitate such fast-forward playout when requested, the server may stream to the client a special "trick-play track" of the video that the client can play at the requested fast-forward speed.

The trick-play track may be a sparser version of the original video, having fewer frames so that the trick-play track can be more quickly transmitted for playout at the client. For instance, if the original video contains I-frames, P-frames, and B-frames, each with particular timestamps indicating their time locations in the video, the trick-play track may contain just the I-frames with their original timestamps. Thus, if the client receives the trick-play track streamed from the server and plays out the I-frames at their indicated times, the result may be effectively a slide-show rendition of the original video, lacking the smooth video transitions from one I-frame to the next. However, the client can conveniently speed up playout of such a trick-play track to the requested fast-forward speed, so as to provide the requested fast-forward playout. For instance, if I-frames normally occur in the original video at a rate of one per second, and if the requested fast-forward speed is 2×, the client may play out the sequence of I-frames at a rate of two per second (i.e., one per half second). Similarly, if the fast-forward speed is 4×, the client may play out the sequence of I-frames at a rate of four per second (i.e., one per quarter second).

A similar process can be applied for fast-reverse playout of video. In particular, the server may stream to the client a trick-play track that contains the I-frames of the video in reverse order, with correspondingly adjusted timestamps. As the client would receive such a trick-play track streamed from the server, the client may play out the I-frames at their indicated timestamps and provide effectively a reverse-order slide-show rendition of the video. And again, the client could speed up playout of such a trick-play track to the requested fast-reverse speed, so as to provide the requested fast-reverse playout.

SUMMARY

Disclosed herein are devices and methods related to controlling streaming of video from a server.

In one respect, for instance, disclosed is a non-transitory computer readable medium having stored thereon instructions executable to cause a processing unit to carry out functions including detecting a request to play video at a fast-play speed defining a multiple of a normal playback speed of the video and, responsive to the request, (i) selecting from a plurality of versions of a trick-play track of the video a version that has the highest I-frame rate that, when played out at the requested fast-play speed, will have a bit rate that does not exceed a network bandwidth threshold, and (ii) causing the selected version of the trick-play track to be streamed over a network from a server to a client for playout.

In another respect, disclosed is method for controlling streaming of video from a server. The method may involve receiving a request to play video at a fast-play speed that defines a multiple of a normal playback speed of the video. Further, the method may involve identifying a plurality of different frame-rate versions of a trick play track corresponding with the video, where each frame-rate version has a respective bit rate that is different than the bit rate of each other frame-rate version due at least in part to each frame-rate version skipping a different number of I-frames of the video than each other frame-rate version. Still further, the method may involve selecting from the identified plurality of frame-rate versions a best frame-rate version by (i) determining, if the bit rate of each frame-rate version were multiplied by the requested fast-play speed to produce an increased bit rate per frame-rate version, which frame-rate version would have the highest increased bit rate that is less than a network bandwidth threshold and (ii) selecting the determined frame-rate version as the best frame-rate version. And the method may then involve causing a server to stream the selected frame-rate version over a network to a client.

In still another respect, disclosed is a computing device that may include a network communication interface, a user interface, a processor, data storage, and program instructions stored in the data storage and executable by the processor to carry out various functions. In particular, the functions may include receiving from the user interface a request to play video at a fast-play speed that defines a multiple of a normal playback speed of the video. Further, the functions may include responsive to the request, (a) selecting a version of a trick-play track of the video based at least in part on the requested fast-play speed and a network bandwidth threshold, wherein selecting the version of the trick-play track based at least in part on the requested fast-play speed and the network bandwidth threshold comprises selecting as the version of the trick-play track a version of the trick-play track that has a rate of skipping I-frames of the video sufficient that the version of the trick-play track, when played at the requested fast-play speed, would have bit rate that does not exceed the network bandwidth threshold, and (b) causing a server to stream the selected version of the trick-play track over a network to the computing device for playout at the user interface.

Yet further, in another respect, disclosed is method for controlling fast-play playout of a video at a requested fast-play speed that defines a multiple of a normal playback speed of the video. The method may involve determining a lowest rate at which a trick-play track of the video should skip I-frames of the video in order for the trick-play track, played at the requested fast-play speed, to have a bit rate less than or equal to a measure of network bandwidth. Further, the method may involve causing a server to stream to a client the trick-play track that skips I-frames at the determined rate.

These, as well as other aspects, advantages, and alternatives will become more apparent to those of ordinary skill in the art by reading the following detailed description, with reference where appropriate to the accompanying drawings.

Further, it should be understood that the description provided in this summary section and elsewhere in this document is intended to serve as an example only. Thus, other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in various suitable combinations and locations.

DETAILED DESCRIPTION

Figure 1:
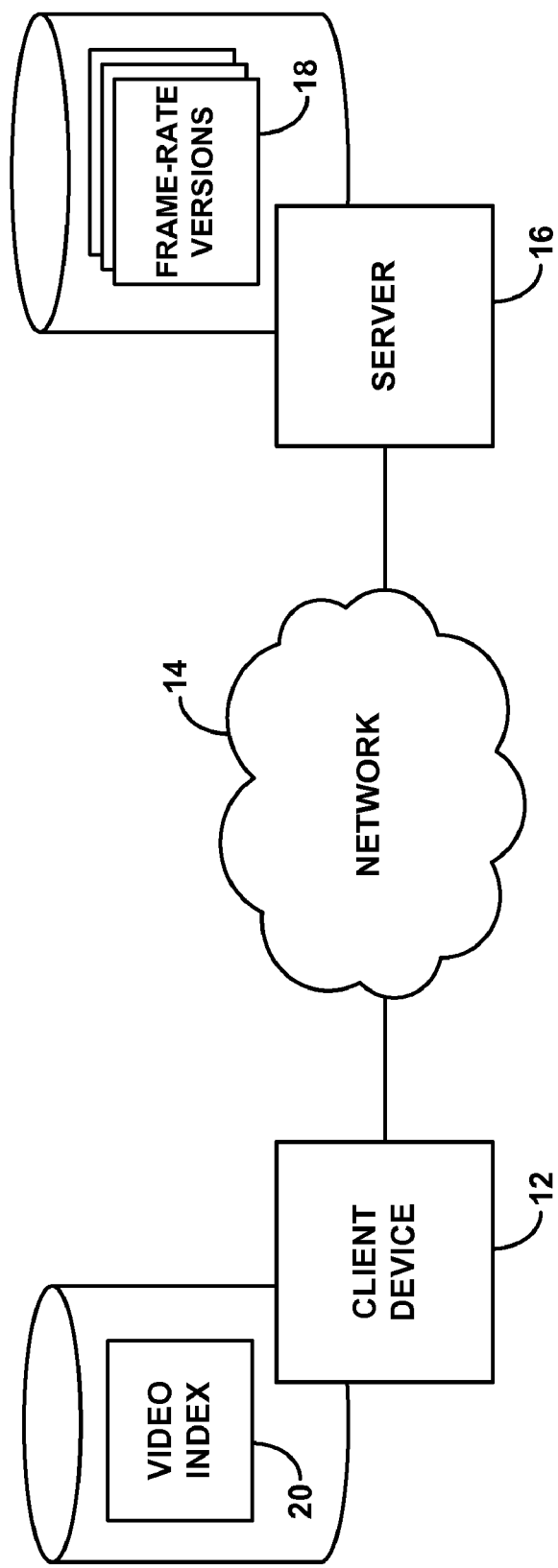
FIG. 1 is a simplified block diagram of network arrangement in which an example of the present method can be implemented.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

In general, to facilitate efficient transmission and storage of video, the video may be represented digitally as a sequence of time-stamped frames, including I-frames, P-frames, and B-frames. Each I-frame (intra-coded frame) may be a substantially full digital image representing a moment in the video. P-frames (predictive-frames) and B-frames (bi-directional frames), on the other hand, may define mere changes in relation to one or more other frames, such as vector displacements from an I-frame and/or other frames. When playing out video represented in this manner, a computing device may present each I-frame at its time-stamped moment and may then render changes to the presented image in accordance with P-frames and/or B-frames between successive I-frames. From a user's perspective, the result may be seamless video motion.

Further, to facilitate streaming of such video over a network from a server to a client, a digital bit stream representing a video as a sequence of frames may be encoded with a suitable codec so as to compress the bit stream. In particular, a codec may operate to receive the raw bit stream representing the video and to apply an algorithm that compresses each sequential time interval of that bit stream, so as to represent each time interval with fewer bits than in the raw bit stream. This compression process can help to facilitate real-time video streaming and playout, by allowing video to be transmitted and received quickly enough over a network that supports limited transmission speed or "bandwidth". In particular, by representing sequential time intervals of the video with fewer bits, less bandwidth is required to support transmission of the media in real time to the requesting client.

In practice, the codec that is used to encode a video bit stream may cause each frame of the video to be represented by a certain number of bits (i.e., a certain quantity of data). As I-frames themselves would contain more data than P-frames and B-frames, the number of bits used to represent each I-frame may be greater than the number of bits used to represent each P-frame and B-frame. Thus, the bit rate of the resulting encoded bit stream may vary over time.

When a client seeks to play out a particular video through streaming from a server, the client may transmit a request to the server to begin streaming the video to the client, and the server may responsively do so. For instance, after engaging in RTSP signaling to set up a streaming media session with the server, the client may transmit an RTSP PLAY request to the server, to request streaming to begin. In response, the server may then retrieve or establish an encoded version of the video and stream the encoded version to the client for playout. As the client receives the encoded version, the client may then buffer the encoded version and, from the buffer, decode and play out the video, rendering each frame at the times indicated by their respective timestamps.

As noted above, to facilitate playing out such a video at a fast-play speed, the server may be arranged to stream to the client a trick-play track of the video, such as a version of the video that contains just the time-stamped I-frames of the video. In particular, when the client receives a user request to play out the video at a specified fast-play speed (e.g., 2×, 4×, etc.), the client may send a PLAY request or other control signal to the server to request the server to stream the trick-play track, and the server may do so. As the client receives the trick-play track streamed from the server, the client may then buffer the trick-play track and, from the buffer, play out the trick-play track at the requested fast-play speed.

In typical practice, this fast-play mode would be triggered while the client is playing out the video at normal speed, i.e., while the client is receiving the encoded video stream from the server and decoding and playing out the video. To switch to the fast-play mode in that scenario, the client may determine a current playout time point in the original video and request the server to transition to streaming the trick-play track beginning at a corresponding time point. For instance, the client may transmit to the server a PLAY request that includes a switch-stream header or the like, and a range header that designates a starting file offset of the trick-play track. The server may then responsively transition from streaming the original video to streaming the corresponding trick-play track of the video, and the client may correspondingly transition to begin playing out the incoming trick-play track at the requested fast-play speed.

To facilitate determining the time point in the trick-play that corresponds with the current playout time point of the original video, the client may have an index that maps various time points of the original video (e.g., various file offsets of the video file) with various time points of the trick-play track (e.g., various file offsets of the trick-play file or a trick-play portion of the video file). In practice, for instance, the server or another network entity may store such an index, and the client may obtain the index by requesting and receiving it from the server or other entity, such as by sending an Hypertext Transfer Protocol (HTTP) request and receiving an HTTP response providing the index. The client may then store the index in its data storage for reference in requesting trick-play streaming (and for other purposes in controlling streaming and playout of the media).

In general, when a client is receiving any bit stream streamed from a server for playout at the client (e.g., for decoding and playout by the client), it would be best for the bit rate of the stream to be no greater than the bandwidth of the network. If the bit rate of the stream is greater than the bandwidth of the network, then the stream may not arrive at the client as fast as the client is playing it out (e.g., decoding and playing it out). As a result, the client's playback buffer may run dry (i.e., experience a buffer underrun), which may interrupt playback. On the other hand, if the bit rate of the stream does not exceed the network bandwidth, then the client should be able to receive the bit stream fast enough to play it out continuously, without experiencing a buffer underrun, thereby providing an improved user experience.

To account for network bandwidth constraints in video streaming, the client may work with the server to cause the server to stream a highest bit rate version of the video (e.g., considering an average bit rate or maximum bit rate of the video) that would be unlikely to exceed a current measure of network bandwidth. In practice, for instance, the index of the video may specify multiple different bit-rate versions, and the client may determine network bandwidth (such as by nearly emptying its buffer and then measuring a rate at which the buffer fills with data arriving freely at the client from the server) and select from the index the bit-rate version that has the highest bit rate not exceeding the determined network bandwidth. The client may then send a PLAY request or the like to the server requesting the server to play that selected bit-rate version. This adaptive playout process can be carried out when starting a video streaming session and/or periodically or otherwise throughout the streaming session so as to dynamically transition between streaming of various bit-rate versions as network bandwidth changes.

In general, this same process can be applied with respect to a trick-play track of video, such as one that includes just I-frames of the video. However, with trick-play tracks that would be used for fast-play, a complicating factor arises. Namely, even if the bit rate of an trick-play track (e.g., encoded trick-play track) would itself not exceed the network bandwidth and could thus be received fast enough for playout at the client, the effective bit rate of such a track when played out at the requested fast-play speed may exceed the network bandwidth, thus possibly causing a buffer underrun.

To appreciate this issue, consider a trick-play track that contains just the I-frames of original video each with its original timestamp, and assume that the trick-play track is encoded so as to produce a bit stream having a bit rate of N (and that that bit rate is fast enough for play out of the I-frames in sequence at their original times). Further, assume that the network bandwidth is six times higher than that trick-play bit rate N. In that case, it should be possible to stream the trick-play track from the server to the client and for the client to play out the trick-play track at its normal speed, e.g., with the I-frames at their original times, and it should also be possible for the client to play out the trick-play track at up to six times its normal speed, i.e., with the I-frame playout rate being six times as fast as the I-frames would appear in the original video. However, if the client attempts to play out that trick-play track at a fast-play speed faster than 6×, the limited network bandwidth may prevent the trick-play track from arriving fast enough to avoid a buffer underrun, and an interruption in playout may result.

The presently disclosed methods and devices may help to overcome this problem and improve trick-play streaming by providing for various different frame-rate versions of a trick-play track and for selecting one such version for streaming based on a consideration of not only network bandwidth but also requested fast-play speed, possibly among other factors (such as buffer fullness for instance).

Advantageously, the various frame-rate versions of the trick-play track may differ from each other at least in terms of how many I-frames they include per base unit time of the original video, and thus how many intervening I-frames they skip. For instance, a first frame-rate version ("+1/1") may have all of the I-frames of the video in sequence, so that if these I-frames were to be played out at their normal timestamps of the video, there would be a particular number of I-frames per second. A next lower frame-rate version ("+½") may then have every other I-frame of the video in sequence, so that if theses I-frames were to be played out at their normal timestamps of the video, half as many I-frames as the +1 version would play out per second. And a still next lower frame-rate version ("+⅓") may have every third I-frame of the video in sequence, so that if these I-frames were to be played out at their normal timestamps of the video, a third as many I-frames as the +1 version would play out per second.

With different rates of I-frames, the various frame-rate versions of the trick-play track, if played out with their I-frames at their original times (i.e., at the same time points that they would have appeared in the original video), would differ from each other in terms of how much time each I-frame would appear. For instance, if the original video has one I-frame per second, then playing out the +1/1 version of the trick-play track would present a new I-frame every second, whereas playing out the +½ version of the trick-play track would present a new I-frame every 2 seconds, and playing out the +⅓ version of the trick-play track would present a new I-frame every 3 seconds.

In addition, assuming the same codec is used for each of these frame-rate versions of the trick-play track, and assuming that each I-frame is thus represented by the same number of bits (perhaps on average), the various frame-rate versions of the trick-play track would differ from each in terms of their encoded bit rates. For instance, if the +1/1 version has a bit rate of N as discussed above, the +½ version, which has half as many I-frames as the +1/1 version, may have a bit rate of N/2, and the +⅓ version, which has a third as many I-frames as the +1/1 version, may have a bit rate of N/3. (In practice, some variations from these numbers may occur due to overhead information or other factors).

Furthermore, it may also be possible to provide different bit-rate versions of such different frame-rate versions, such as multiple different bit-rate versions of each frame-rate version, by applying different codecs or different codec parameters. In any case, however, there could be multiple different frame-rate versions of a trick-play track, with each frame-rate version differing from each other frame-rate version in terms of rate of I-frames (e.g., rate of skipping I-frames) and/or bit rate, with a possible direct correlation between I-frame rate and bit rate.

In playing out a trick-play track at a particular fast-play speed, it would be most desirable to include as many I-frames as possible, since the more I-frames that get played out per second, the smoother the playout will be. Thus, if the +1/1 version of the trick-play track has the greatest I-frame rate as discussed above, it would be best to play out the +1/1 version at whatever fast-play speed is requested. For instance, if the I-frames of the +1/1 version occur at a rate of one per second in line with the original video and the requested fast-play speed is 2×, it would be best to play out the I-frames of the +1/1 version at a rate of two per second. Likewise, if the requested fast-play speed is 3×, it would be best to play out the I-frames of the +1/1 version at a rate of three per second.

As noted above, however, speeding up playout of an incoming stream too much could undesirably cause the client's playback buffer to run dry. For instance, with the example above, if the network bandwidth is six times as much as the bit rate of the encoded +1/1 version of the trick-play track and the requested fast-play speed is 8×, the client may not receive the +1/1 version fast enough to be able to play out the +1/1 version at 8× speed, and the client may experience a buffer underrun.

According to the present disclosure, to help avoid this problem, a client may instead select the highest available frame-rate version (e.g., with the most number of I-frames per second) that, when played out at the requested fast-play rate, will not exceed the current network bandwidth and will thus be unlikely to cause a buffer underrun.

To do this in practice, the client can select the frame-rate version that has the highest I-frame rate (or lowest I-frame skipping rate) that, when played out at the requested fast-play speed, would have a bit rate not exceeding the current network bandwidth. Moreover, if multiple frame-rate versions have the highest I-frame rate and could be played out at the requested fast-play speed without causing a buffer underrun, the client may then select the highest bit-rate version of those frame-rate versions. The client may then request the server to stream the selected frame-rate version to the client. And as the client receives the selected frame-rate version streamed from the server, the client may buffer the frame-rate version (if appropriate) and play out the frame-rate version at the requested fast-play speed.

To facilitate this, a server may store or otherwise have access to pre-generated instances of the various frame-rate versions of a trick-play track, perhaps as part of a media container containing the original video, or the server may generate a selected frame-rate version the fly (such as by stripping I-frames of a +1/1 version of the trick-play track at a rate sufficient to produce a desired frame-rate version). These may be encoded versions, and so the relevant bit rate of each frame-rate version may be a bit rate of the encoded representation of that frame-rate version. Further, an index of the video may then map the original video with each version of the trick-play track respectively to enable trick-play playout in correspondence with the original video, and may specify a bit rate respectively of each frame-rate version of the trick-play track. As noted above, the client may obtain this index from the server or another entity and may use it as a basis to determine which version of a trick-play track to ask the server to stream, based on a consideration of at least (i) which speed of playback is requested and (ii) the current network bandwidth.

In practice, for instance, when the client receives a request for fast-play playout at a particular speed, the client may divide the current network bandwidth by the requested fast-play speed to determine a maximum trick-play bit rate, and the client may then select the frame-rate version that has the highest bit rate less than or equal to that determined maximum.

As a specific example of this, assume that the +1/1 version has a bit rate of 6,000 Kbps, the +½ version has a bit rate of 3,000 Kbps, and the +⅓ version has a bit rate 1,500 Kbps, and assume that the requested speed is 2× and the current network bandwidth is 7,000 Kbps. In this example, dividing the network bandwidth 7,000 Kbps by the speed of 2 would establish that the highest bit rate tolerable for trick play track playout would be 3,500 Kbps. (That is, a trick-play track with a bit rate of up to 3,500 Kbps could be received at double speed in 7,000 Kbps network bandwidth and could therefore be played out at 2× fast-play speed without a buffer underrun). Thus, in this example, the client may select frame-rate version +½, which has a bit rate of 3,000 Kbps, because that is the highest frame-rate version that has a bit-rate less than the determined maximum of 3,500 Kbps.

As another way to look at this, a client may determine for each of the available frame-rate versions of the trick play track what the effective increased bit rate of the frame-rate version would be if the version were played out at the requested fast-play speed, and the client may then select the frame-rate version that would have the highest increased bit rate that does not exceed the network bandwidth.

Considering the numbers above, for instance, the client could determine that, at 2× playout speed, the increased bit rate of version +1/1 would be 12,000 Kbps, the increased bit rate of version +½ would be 6,000 Kbps, and the increased bit rate of version +⅓ would be 3,000 Kbps. In turn, the client may then conclude that the one of these frame-rate versions that would have the highest increased bit rate that does not exceed the 7,000 Kbps network bandwidth would be version +½, as its increased bit rate would be just 6,000 Kbps. Thus, the client may likewise select frame-rate version +½ to be streamed.

Upon selecting a frame-rate version of the trick-play track to be streamed, the client may then request the server to stream the selected frame-rate version of the trick-play track to the client. And as the client receives the frame-rate version of the trick-play track streamed from the server, the client may play out the trick-play track at the requested fast-play speed. Continuing with the example above, for instance, if the +½ version of the trick-play track has I-frames $I_0, I_2, I_4, I_6, I_8$, etc., occurring in normal playout time respectively at seconds 0, 2, 4, 6, 8, etc., the client may play out those I-frames at 2× speed by playing them out at seconds 0, 1, 2, 3, 4, etc., likely without experiencing a buffer underrun.

In an alternative implementation, various aspects of this method described above as being carried out by the client could instead be carried out by the server. For instance, in practice, the client could determine the network bandwidth and could report that network bandwidth and the requested fast-play speed to the server, in an HTTP, RTSP, RTMP, RTCP or other control message. The server may then apply the process discussed above to select a best frame-rate version of the trick-play track to stream to the client. And the server may then stream that selected frame-rate version to the client for playout.

Furthermore, whether the client or server selects the desired frame-rate version through this process, the server could either retrieve that selected version from data storage and stream the version to the client, or the server could generate the version on the fly. For instance, as noted above, the server could retrieve a +1/1 version of the trick-play track that has all of the I-frames of the original video and could strip I-frames at a rate sufficient to generate the desired version for streaming to the client.

Referring to the drawings, FIG. 1 is a simplified block diagram of a network arrangement in which an example of the present method can be implemented. As shown in FIG. 1, the network arrangement includes a client device 12, a network (e.g., the Internet or other network) 14, and a server 16, with the server having access to multiple frame-rate versions 18 of a trick-play track, and the client having access to a video index 20 that specifies the various frame-rate versions.

With this arrangement, as discussed above, the client 12 may set up a streaming media session through which the server 16 will stream video to the client via the network 14. For instance, the client may send an RTSP DESCRIBE request to the server and may receive in response from the server an RTSP DESCRIBE reply that designates a video stream that the server can stream to the client. Further, the client may send an RTSP PLAY request to the server to cause the server to stream the video to the client.

Before and/or during streaming of the video from the server to the client, the client may receive a user request for fast-play playout at a particular speed and may then, by reference to the index 20, select one of the specified frame-rate versions of the trick-play track through the process discussed above. The client may then send to the server an RTSP PLAY request or the like to request the server to stream the selected frame-rate version of the trick-play track, and the server may do so. As the client receives the selected frame-rate version of the trick-play track from the server, the client may then play out the selected frame-rate version at the requested fast-play speed.

Figure 2:
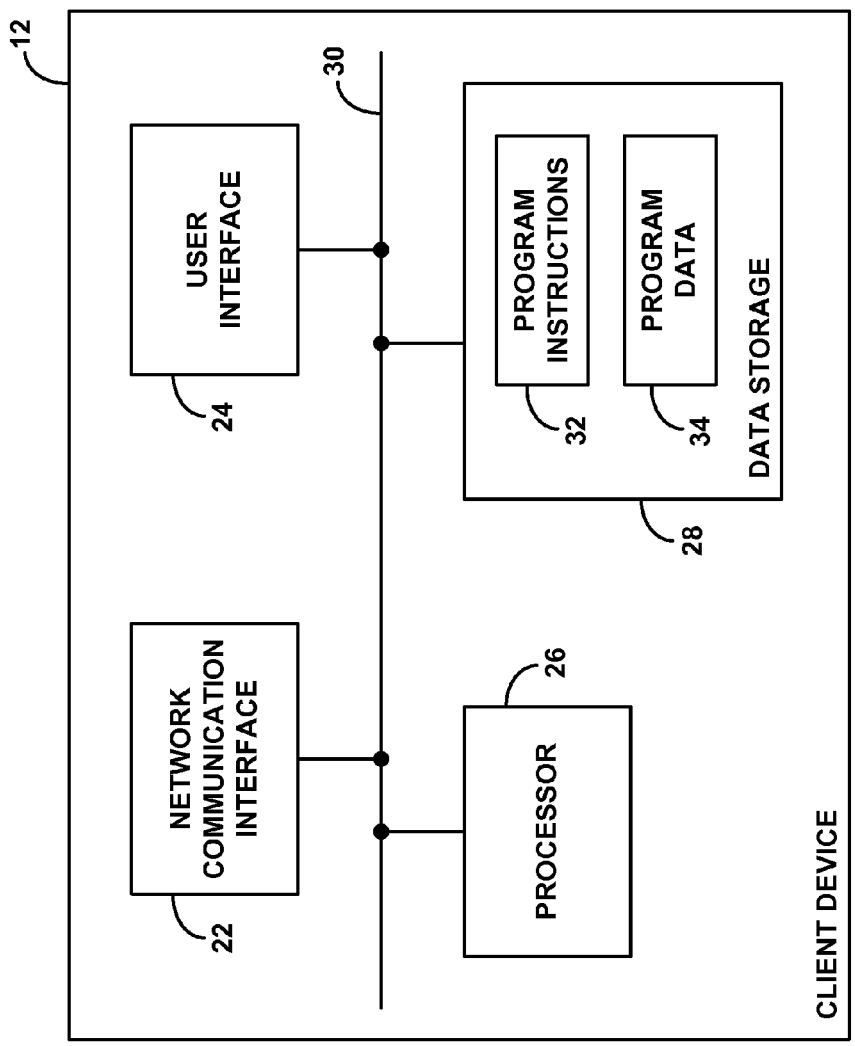
FIG. 2 is a simplified block diagram of a client device operable within the network arrangement of FIG. 1.

Client device 12 can be any computing device that is arranged to request and receive streaming media and to play out the media as the media is being received. For example, the client device may be a personal computer, a tablet computer, a handheld cell phone or other communication device, an integrated audio or video player, a gaming device, or any other device now known or later developed. FIG. 2 is a simplified block diagram showing components that can be included in such a device to facilitate carrying out aspects of the method in practice.

As shown in FIG. 2, the example client device includes a network communication interface 22, a user interface 24, a processor 26, and data storage 28, all of which may be coupled together by a system bus or other connection mechanism 30.

Network communication interface 22 may comprise a wired or wireless interface arranged to allow client 12 to communicate on network 14 and with entities via network 14, such as with server 16 for instance. For example, the network communication interface 22 may comprise a wired or wireless Ethernet interface for communication on a local area network and in turn via a router and/or one or more other network elements with entities on network 14. As another example, the network communication interface may comprise a cellular wireless interface, arranged to engage in air interface communication with a radio access network according to a protocol such as LTE, WiMAX, CDMA, GSM, or the like, and via the radio access network with entities on network 14. Other examples are possible as well.

User interface 24 may enable the client 12 to interact with a user of the client and may thus comprise output components such as a display screen, an audio speaker, and the like, and input components such as a keyboard, camera, touch-pad or touch-screen, and the like. Further, the user interface 24 may include circuitry for converting media from digital to analog form, to facilitate playout of digitized media to a user.

At the user interface, the client may play video streamed from the server, such as a trick-play track for instance. Further, the client may present a seek function such as a scroll bar that a user can use to select playout of particular parts of the video, and the client may further present fast-play buttons, such as fast-forward and fast-reverse buttons, that a user can use to request the client to play out a video at a particular fast-play speed.

Processor 26 may comprise one or more general purpose processors (e.g., INTEL microprocessors) and/or one or more special purpose processors (e.g., application specific integrated circuits, digital signal processors, etc.) If processor 26 includes multiple processors, the processors may be arranged to work in combination (e.g., in parallel) or separately. Further, processor 26 may be integrated in whole or in part with network communication interface 22 or one or more other components.

Data storage 28 may then comprise one or more volatile and/or non-volatile storage components, such as magnetic, optical, organic, flash, or other types of storage now known or later developed, and may be integrated in whole or in part with processor 26 and/or may be removable from client 12 or externally connected (through wired or wireless means) with client 12. As shown, data storage 28 contains program instructions 32 and program data 34. In general, the program instructions 32 may be executable by processor 26 to carry out various client functions described herein. Alternatively, some or all such functions could be carried out by various other machine implementations. Program data 34 may then include data such as received video content buffered for playout, a video index, and data defining a graphical user interface that the client can present on user interface 24 to facilitate user requesting video playout, including fast-play playout.

Figure 3:
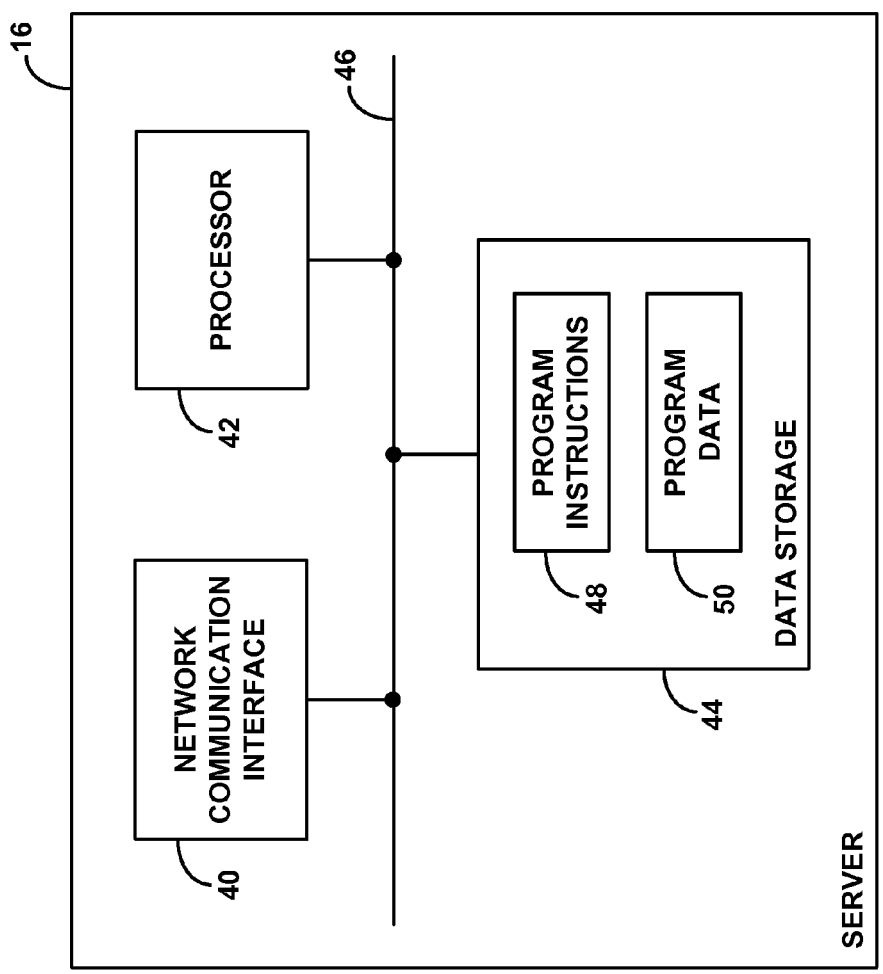
FIG. 3 is a simplified block diagram of a server operable within the network arrangement of FIG. 1.

The server 16 may be any computing device that is arranged to receive a request for streaming video and to stream the requested video for playout. As such, the server would likely be a server class computer. However, the server could be more simple, such as one of the devices described above yet arranged with logic to operate as a server. FIG. 3 is a simplified block diagram showing components that can be included in such a server to facilitate carrying out aspects of the method in practice.

As shown in FIG. 3, the example server includes a network communication interface 40, a processor 42, and data storage 44, all of which may be coupled together by a system bus or other connection mechanism 46.

Network communication interface 40 may comprise a wired or wireless interface arranged to allow the server 16 to communicate on network 14 and with entities via network 14, such as with client 12 for instance. As such, the network communication interface 40 may comprise a wired or wireless Ethernet interface, a cellular wireless interface, or any other type of network interface.

Processor 42 may comprise one or more general purpose processors and/or one or more special purpose processors and may be integrated in whole or in part with network communication interface. And data storage 44 may comprise one or more volatile and/or non-volatile storage components and may be integrated in whole or in part with processor 42. As shown, data storage 44 contains program instructions 48 executable to carry out various server functions described herein, and program data 50 such as video and various frame-rate versions of a trick-play track for streaming to client 12 for playout.

Figure 4:
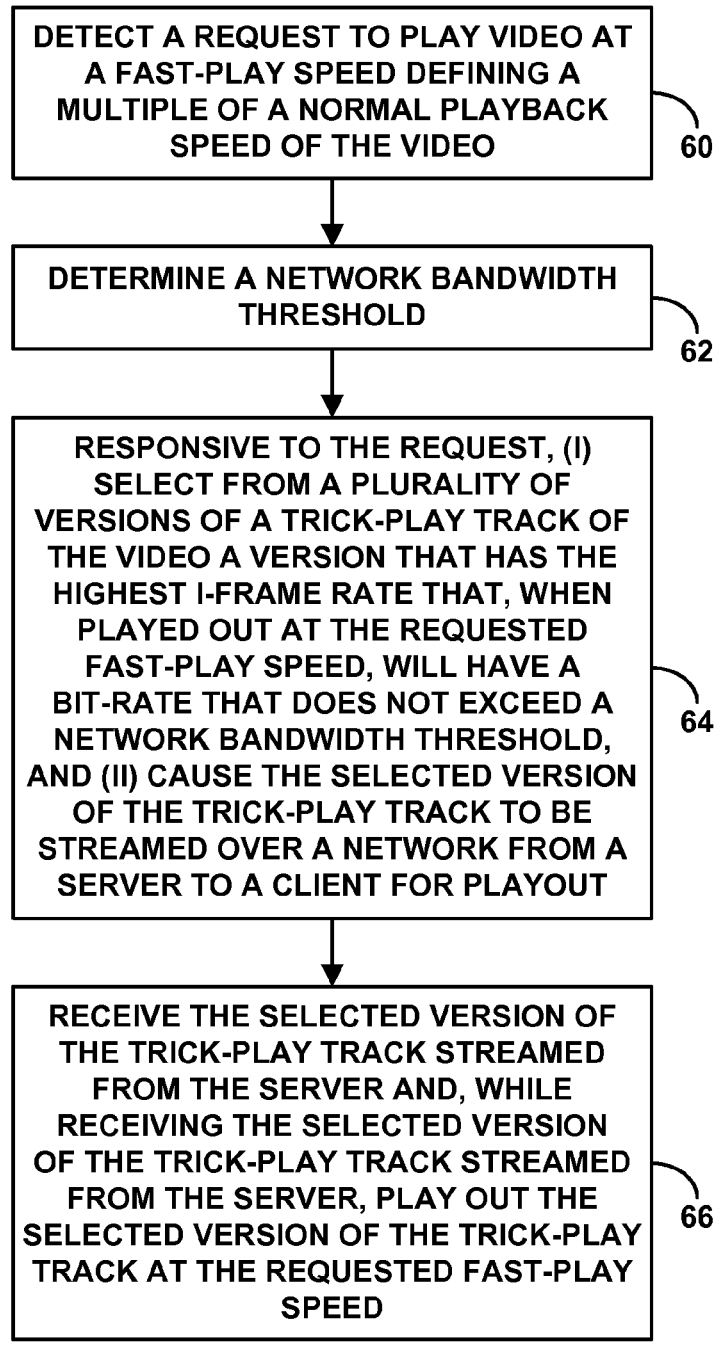
FIG. 4 is flow chart depicting functions that can be carried out in accordance with an example implementation.

FIG. 4 is next a flow chart depicting functions that could be carried out in accordance with an example implementation of the present method, to control trick-play streaming. These functions could be defined by instructions encoded on a non-transitory computer readable medium (e.g., magnetic, optical, or other type of data storage mechanism such as those discussed above for instance), which could be executable by a processing unit, such as a processing that is part of the client or server for instance. Or the method could be implemented in another context.

As shown in FIG. 4, at block 60, the example method includes detecting a request to play video at a fast-play speed defining a multiple of a normal playback speed of the video. For instance, as discussed above, this could be a request to play the video at a speed of 2×, 3×, 4×, or some other integer or non-integer multiple of the normal playback speed of the video. The user may or may not know the actual speed being requested when submitting a request to speed up play by a certain amount, or by some multiple of that amount. For instance, the user may select a number of arrows or speed bars to indicate a desired level of fast-play, and the client may treat that as a request for playout at a corresponding fast-play speed. Further, as noted above, the fast-play could be fast-forward or fast-reverse.

This function of detecting the request to play the video at the fast-play speed could involve receiving a signal that represents the request having been input at a user interface of the client. For instance, if the processor of the client carries out this function, the processor may receive such a signal when a user provides input at the user interface to request the fast-play playout. Alternatively or additionally, if the processor of the server carries out this function, the processor may receive such a signal from the client, as the client may send such a signal to the server in response to receiving the user input defining the request.

At block 62, which may occur at some other place in the flow, the example method may further involve determining a network bandwidth threshold. The network bandwidth threshold may be a real-time (i.e., current or substantially current) measure of the network bandwidth or some derivation of such a measure for instance. As such, the bandwidth threshold may change from time to time or may be constant and possibly even predetermined.

If carried out by a processor of the client, as noted above, this function of determining the network bandwidth threshold may involve the client nearly draining its playback buffer and then allowing the buffer to fill with incoming data from the server, and measuring the rate at which the buffer fills, or otherwise measuring a rate of arrival of data at the client from the server. The client may then deem the measured rate or some multiple or offset version of the measured rate to be the network bandwidth threshold. Alternatively, the client could determine the network bandwidth threshold in some other manner and/or be informed of the network bandwidth threshold by another entity. On the other hand, if the function is carried out by the processor of the server, the function may involve receiving a report of network bandwidth or of the network bandwidth threshold from the client or from one or more other entities in the communication path between the server and the client, or the server could determine the network bandwidth threshold in any other manner. As noted above, for instance, the server could receive from the client a signal that specifies the requested fast-play speed and the network bandwidth threshold, so as to allow the server to select a best frame-rate version of the trick-play track.

At block 64, the example method further involves responding to the request for fast-play of the video by (i) selecting from a plurality of versions of a trick-play track of the video a version that has the highest I-frame rate that, when played out at the requested fast-play speed, will have a bit-rate that does not exceed a network bandwidth threshold, and (ii) causing the selected version of the trick-play track to be streamed over a network from a server to a client for playout.

The function of selecting the trick-play track version could take various forms. As discussed above, for instance, the function could involve dividing the network bandwidth threshold by the requested fast-play speed to determine a maximum tolerable bit rate of a trick-play track and then selecting the version of the trick-play track that has the highest bit-rate not exceeding that maximum tolerable bit rate. Alternatively, this function could involve determining for each possible version of the trick-play track what the effective bit rate of the version would be if played out at the requested fast-play speed (e.g., if the normal-speed bit-rate of the trick-play track were to be multiplied by the requested fast-play speed), and then selecting the version that would have the highest effect bit rate not exceeding the network bandwidth threshold. Other implementations of this function could be possible as well.

Moreover, as noted above, the function of selecting the version from the plurality of versions could involve referring to a video index that specifies the plurality of versions and selecting the version from the specified plurality. The fact that the versions are specified by the index may or may not mean that the versions exist already. The index may, for instance, merely indicate as a general matter versions of the trick-play track that could be streamed.

In turn, the function of causing the selected version of the trick-play track to be streamed over a network from a server to a client could also take various forms. For instance, if the function is carried out by a processor of the client, the function could involve transmitting over the network to the server via the network communication interface of the client a control signal, such as an HTTP, RSTP, RTMP, or RTCP request, requesting the server to stream the selected version of the trick-play track to the client. Alternatively, if the function is carried out by a processor of the server, the function could involve the processor causing the network communication interface of the server to stream the selected version of the trick-play track in real-time to the client.

As further noted above, the server could be arranged to generate the selected version of the trick-play track on the fly. For instance, once the selected version has been selected, the server could generate the version by stripping I-frames from a +1/1 version of the trick-play track at a rate sufficient to generate the selected version.

At block 66, the example method further involves receiving the selected version of the trick-play track streamed from the server and, while receiving the selected version of the trick-play track streamed from the server, playing out the selected version of the trick-play track at the requested fast-play speed. For instance, as noted above, the client may speed up the rate at which it presents the I-frames of the trick-play track so that the I-frames are presented at the fast-play speed.

Figure 5:
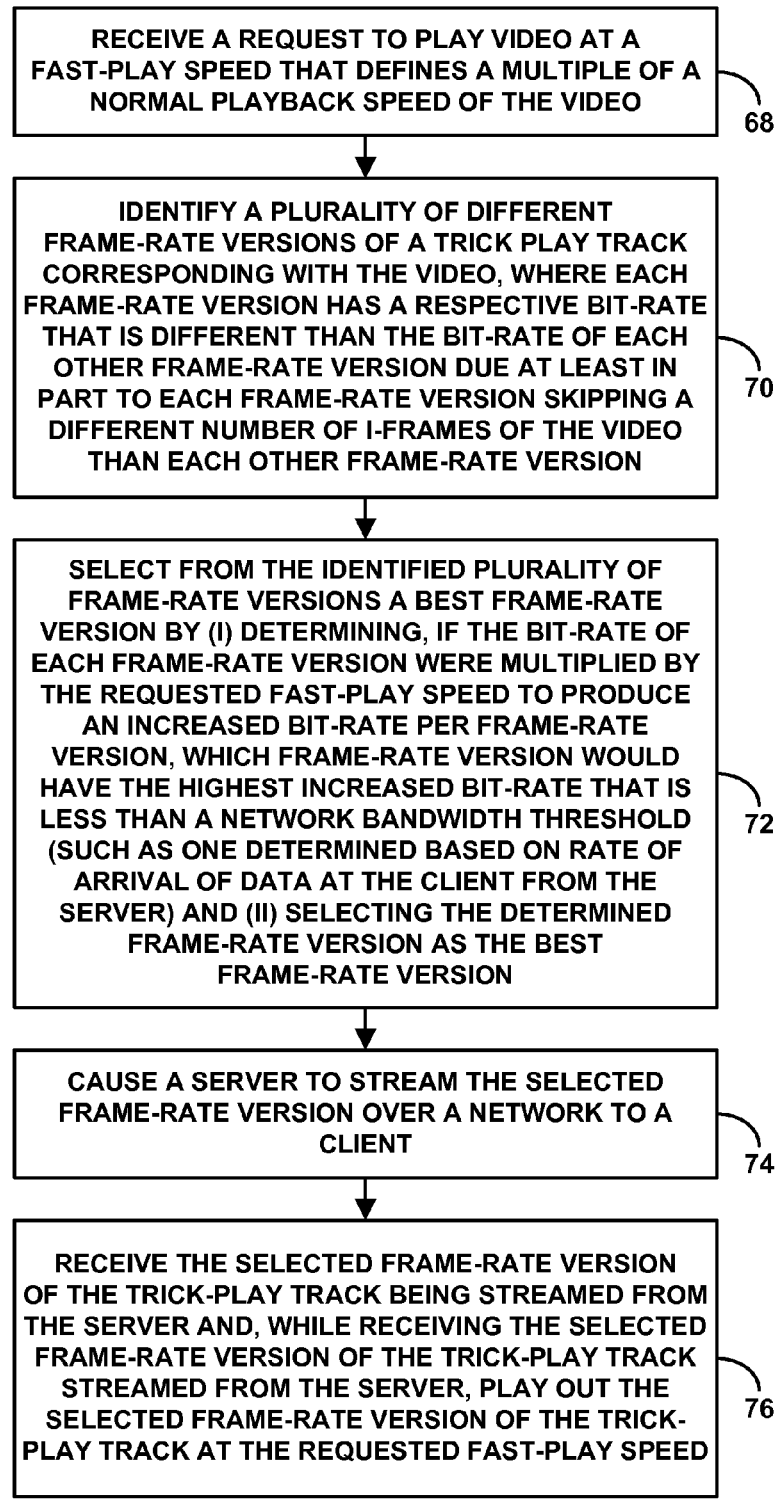
FIG. 5 is another flow chart depicting functions that can be carried out in accordance with an example implementation.

FIG. 5 is next another flow chart depicting functions that could be carried out in accordance with an example implementation of the present method, to control trick-play streaming. This method may be carried out by a client, server, and/or other entity or combination of entities.

As shown in FIG. 5, at block 68, the example method involves receiving a request to play video at a fast-play speed that defines a multiple of a normal playback speed of the video.

At block 70, the example method then further involves identifying a plurality of different frame-rate versions of a trick play track corresponding with the video, where each frame-rate version has a respective bit-rate that is different than the bit-rate of each other frame-rate version due at least in part to each frame-rate version skipping a different number of I-frames of the video than each other frame-rate version. For instance, after obtaining an index of the video that specifies the plurality of different frame-rate versions, this function may involve referring to the index to determine the various available versions.

At block 72, the example method may then involve selecting from the identified plurality of frame-rate versions a best frame-rate version by (i) determining, if the bit-rate of each frame-rate version were multiplied by the requested fast-play speed to produce an increased bit-rate per frame-rate version, which frame-rate version would have the highest increased bit-rate that is less than a network bandwidth threshold (such as one determined based on rate of arrival of data at the client from the server) and (ii) selecting the determined frame-rate version as the best frame-rate version. For example, as discussed above, this function may involve (a) dividing the network bandwidth threshold by the requested fast-play speed to determine a maximum trick-play bit rate, and (b) selecting as the best frame-rate version the frame-rate version that has the highest bit-rate not exceeding the determined maximum trick-play bit rate.

At block 74, the example method may then further involve causing a server to stream the selected frame-rate version over a network to a client. For instance, this function could involve the client transmitting to the server a control signal that directs the server to stream the selected frame-rate version to the client.

At block 76, the example method then involves receiving the selected frame-rate version of the trick-play track being streamed from the server and, while receiving the selected frame-rate version of the trick-play track streamed from the server, playing out the selected frame-rate version of the trick-play track at the requested fast-play speed.

Figure 6:
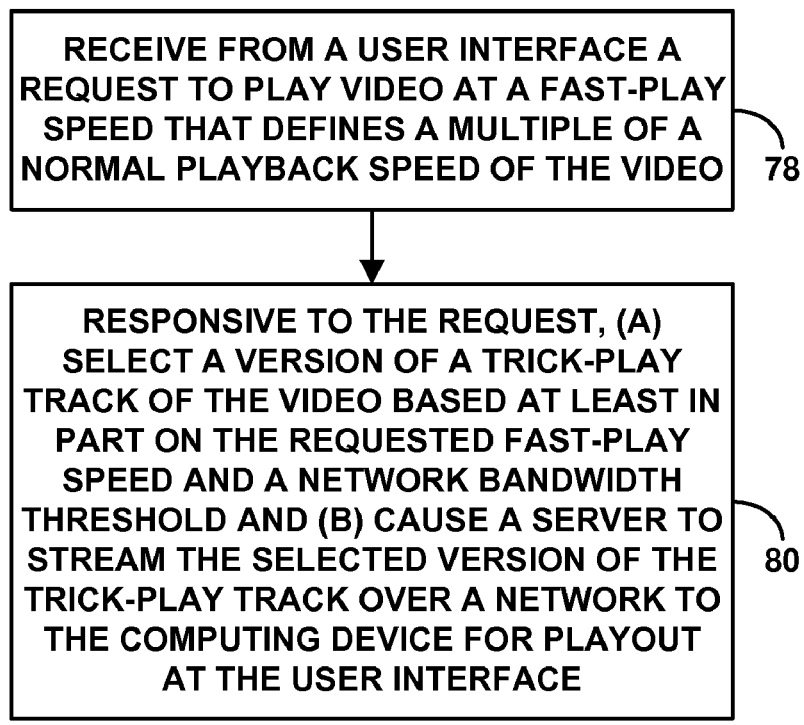
FIG. 6 is still another flow chart depicting functions that can be carried out in accordance with an example implementation.

FIG. 6 is next another flow chart depicting functions that could be carried out in accordance with an example implementation of the present method, to control trick-play streaming. This method may be carried out by a computing device, such as the client for instance.

As shown in FIG. 6, at block 78, the example method involves receiving from the user interface a request to play video at a fast-play speed that defines a multiple of a normal playback speed of the video. Further, at block 80, the example method involves, responsive to the request, (a) selecting a version of a trick-play track of the video based at least in part on the requested fast-play speed and a network bandwidth threshold, wherein selecting the version of the trick-play track based at least in part on the requested fast-play speed and the network bandwidth threshold comprises selecting as the version of the trick-play track a version of the trick-play track that has a rate of skipping I-frames of the video sufficient that the version of the trick-play track, when played at the requested fast-play speed, would have bit rate that does not exceed the network bandwidth threshold, and (b) causing a server to stream the selected version of the trick-play track over a network to the computing device for playout at the user interface.

As in the examples discussed above, this example method may further involve determining the network bandwidth threshold. Further, the function of causing the server to stream the selected version of the trick-play track to the computing device may again involve transmitting to the server via a network communication interface of the computing device a control signal that directs the server to stream to the computing device the selected version of the trick-play track.

Moreover, as in the examples discussed above, data storage of the computing device may hold an index of the video that specifies a plurality of versions of the trick-play track, with the plurality of versions of the trick-play track differing from each other at least in terms of their respective rate of skipping I-frames of the video and thus their respective bit rate. In that case, the function of selecting the version of the trick-play track may involve (i) referring to the index to identify one or more of the specified plurality of versions of the trick-play track that, when played at the requested fast-play speed, would have an increased bit rate that would not exceed the network bandwidth threshold, and (ii) selecting a highest bit-rate one of the identified one or more identified versions of the trick-play track. For instance, the function may involve (a) dividing the network bandwidth threshold by the requested fast-play speed to determine a maximum trick-play bit rate, and (b) selecting from the plurality of versions of the trick-play track the version that has the highest bit-rate not exceeding the determined maximum trick-play bit rate.

Figure 7:
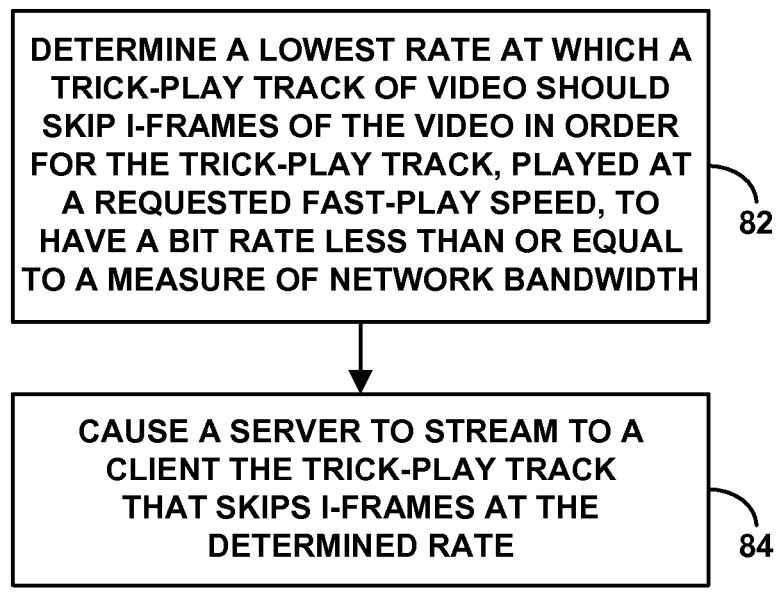
FIG. 7 is yet another flow chart depicting functions that can be carried out in accordance with an example implementation.

Finally, FIG. 7 is yet another flow chart depicting functions that can be carried out in accordance with an example implementation of the present method, to control fast-play playout of video at a requested fast-play speed that defines a multiple of a normal payback speed of the video. As with the implementations described above, this example method can be carried out by the client, the server, and/or any other entity or combination of entities.

As shown in FIG. 7, at block 82, this example method involves determining a lowest rate at which a trick-play track of the video should skip I-frames of the video in order for the trick-play track, played at the requested fast-play speed, to have a bit rate less than or equal to a measure of network bandwidth. For instance, assuming that each I-frame would be encoded with a particular number of bits (e.g., on average), an entity carrying out this function may divide the network bandwidth (in bits per second) by that number of bits to determine a tolerable number of encoded I-frames per second, i.e., a tolerable I-frame rate. Assuming a particular I-frame rate of the +1/1 version of the trick-play track (e.g., one I-frame per second), the entity may then determine the least number of those I-frames per second that should be skipped in order to be within the tolerable I-frame rate. Other processes for carrying out this function could be possible as well At block 84, the example method then involves causing a server to stream to a client the trick-play track that skips I-frames at the determined rate. For instance, if the client was the entity that determined the I-frame skipping rate, the client may then select from a plurality of predefined frame-rate versions of the trick-play track the highest frame-rate version that most closely matches the determined I-frame skipping rate, and the client may then send to the server a control signal requesting the server to stream that frame-rate version of the trick-play track to the client. Alternatively, the client may send to the server a control signal that specifies the determined I-frame skipping rate, and the server may responsively select a closest matching frame-rate version or dynamically generate a version with that I-frame skipping rate. The server may then stream the determined trick-play track to the client for playout.

In this and other implementations described above, as noted, the trick-play track may include just I-frames of the original video and may therefore omit any P-frames and B-frames of the original video. Alternatively, the trick-play track may also include some P-frames and B-frames.

Further, it should be understood that the term "bit rate" as used herein is not intended to be limiting but could encompass largely any measure of data rate, including but not limited to number of bits per second or other unit time, number of bytes per second or other unit time, and the like. Similarly, the term "bandwidth" as used herein could also encompass any such measures of data rate. Where bandwidth is compared with bit rate, it would be best for the comparison to be with respect to the same units of data and units of time, unless a scaling factor is applied to facilitate the comparison.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A non-transitory computer readable medium having stored thereon instructions executable to cause a processing unit to carry out functions comprising:
    detecting a request to play video at a fast-play speed defining a multiple of a normal playback speed of the video; and
    responsive to the request, (i) selecting from a plurality of versions of a trick-play track of the video a version that has the highest I-frame rate that, when played out at the requested fast-play speed, will have a bit-rate that does not exceed a network bandwidth threshold, wherein each version has a normal speed bit-rate, and wherein selecting from the plurality of versions of the trick-play track of the video a version that has the highest I-frame rate that, when played out at the requested fast-play speed, will have a bit-rate that does not exceed the network bandwidth threshold comprises a function selected from the group consisting of (a) determining which of the versions would have a highest increased bit-rate less than or equal to the network bandwidth threshold when played out at the requested fast-play speed and (b) determining which of the versions has a highest normal speed bit-rate less than or equal to the network bandwidth threshold divided by the requested fast play speed, and (ii) causing the selected version of the trick-play track to be streamed over a network from a server to a client for playout.

2. The non-transitory computer readable medium of claim 1, wherein the functions further comprise determining the network bandwidth threshold.

3. The non-transitory computer readable medium of claim 1, wherein determining the network bandwidth threshold comprises determining the network bandwidth threshold based on a rate of arrival of data at the client from the server.

4. The non-transitory computer readable medium of claim 1, wherein detecting the request comprises receiving a signal representing the request having been input at a user interface of the client.

5. The non-transitory computer readable medium of claim 4, wherein the processing unit is part of the client.

6. The non-transitory computer readable medium of claim 4,
    wherein the processing unit is part of the server,
    wherein receiving the signal representing the request comprises receiving the signal from the client, and
    wherein causing the selected version of the trick-play track to be streamed over the network from the server to the client for playout comprises causing a network communication interface of the server to stream the selected version of the trick-play track in real-time to the client.

7. The non-transitory computer readable medium of claim 6, wherein the signal transmitted from the client to the server comprises a signal specifying the requested fast-play speed and the network bandwidth threshold.

8. The non-transitory computer readable medium of claim 7, wherein the functions further comprise:
    generating the selected version on the fly for streaming to the client.

9. The non-transitory computer readable medium of claim 8, wherein generating the selected version on the fly comprises stripping a plurality of I-frames from a base version of the trick-play track to produce the selected version of the trick-play track.

10. The non-transitory computer readable medium of claim 1, wherein selecting the version from the plurality of versions comprises referring to an index of the video that specifies the plurality of versions and selecting the version from the specified plurality.

11. The non-transitory computer readable medium of claim 10,
    wherein the index specifies respectively for each version of the plurality the normal-speed bit-rate of the version, and
    wherein selecting from the plurality of versions a version that has the highest I-frame rate that when played out at the requested fast-play speed will have a bit-rate that does not exceed the network bandwidth threshold comprises determining, if the normal-speed bit-rate of each version of the plurality were to be multiplied by the fast-play speed to establish the increased bit-rate of the version, which version of the plurality would have the highest increased bit-rate that does not exceed the network bandwidth threshold.

12. The non-transitory computer readable medium of claim 1,
    wherein selecting from the plurality of versions a version that has the highest I-frame rate that when played out at the requested fast-play speed will have a bit-rate that does not exceed the network bandwidth threshold comprises determining, if the normal-speed bit-rate of each version of the plurality were to be multiplied by the fast-play speed to establish an increased bit-rate, which version of the plurality would have the highest increased bit-rate that does not exceed the network bandwidth threshold.

13. The non-transitory computer readable medium of claim 1,
    wherein the normal speed bit-rate of each version of the plurality of versions is a trick-play bit-rate of the version, and
    wherein selecting from the plurality of versions a version that has the highest I-frame rate that when played out at the requested fast-play speed will have a bit-rate that does not exceed the network bandwidth threshold comprises (i) dividing the network bandwidth threshold by the requested fast-play speed to determine a maximum trick-play bit-rate, and (ii) selecting from the plurality of versions the version that has the highest trick-play bit-rate that does not exceed the determined maximum trick-play bit-rate.

14. The non-transitory computer readable medium of claim 1, wherein causing the selected version of the trick-play track to be streamed from the server to the client for playout comprises transmitting from the client to the server a control signal that directs the server to stream the selected version of the trick-play track to the client for playout.

15. The non-transitory computer readable medium of claim 1, wherein the functions further comprise:
receiving the selected version of the trick-play track streamed from the server; and
while receiving the selected version of the trick-play track streamed from the server, playing out the selected version of the trick-play track at the requested fast-play speed.

16. A method comprising:
receiving a request to play video at a fast-play speed that defines a multiple of a normal playback speed of the video;
identifying a plurality of different frame-rate versions of a trick play track corresponding with the video, where each frame-rate version has a respective bit-rate that is different than the bit-rate of each other frame-rate version due at least in part to each frame-rate version skipping a different number of I-frames of the video than each other frame-rate version;
selecting from the identified plurality of frame-rate versions a best frame-rate version by (i) determining, if the bit-rate of each frame-rate version were multiplied by the requested fast-play speed to produce an increased bit-rate per frame-rate version, which frame-rate version would have the highest increased bit-rate that is less than a network bandwidth threshold and (ii) selecting the determined frame-rate version as the best frame-rate version; and
causing a server to stream the selected frame-rate version over a network to a client.

17. The method of claim 16, further comprising:
determining the network bandwidth threshold based on a rate of arrival of data at the client from the server.

18. The method of claim 16, further comprising:
obtaining an index of the video, the index specifying the plurality of different frame-rate versions of the trick-play track,
wherein identifying the plurality of different frame-rate versions comprises referring to the index that specifies the plurality of different frame-rate versions of the trick-play track.

19. The method of claim 16, carried out by the client.

20. The method of claim 16,
wherein selecting the best frame-rate version comprises (a) dividing the network bandwidth threshold by the requested fast-play speed to determine a maximum trick-play bit rate, and (b) selecting as the best frame-rate version the frame-rate version that has the highest bit-rate not exceeding the determined maximum trick-play bit rate.

21. The method of claim 16, wherein causing the server to stream the selected frame-rate version over the network to the client comprises transmitting from the client to the server a control signal that directs the server to stream the selected frame-rate version to the client.

22. The method of claim 16, further comprising:
receiving the selected frame-rate version of the trick-play track being streamed from the server; and
while receiving the selected frame-rate version of the trick-play track streamed from the server, playing out the selected frame-rate version of the trick-play track at the requested fast-play speed.

23. A computing device comprising:
a network communication interface;
a user interface;
a processor;
data storage; and
program logic stored in the data storage and executable by the processor to carry out functions comprising:
receiving from the user interface a request to play video at a fast-play speed that defines a multiple of a normal playback speed of the video, and
responsive to the request, (a) selecting a version of a trick-play track of the video based at least in part on the requested fast-play speed and a network bandwidth threshold, wherein selecting the version of the trick-play track based at least in part on the requested fast-play speed and the network bandwidth threshold comprises selecting as the version of the trick-play track a version of the trick-play track that has a rate of skipping I-frames of the video sufficient that the version of the trick-play track, when played at the requested fast-play speed, would have bit rate that does not exceed the network bandwidth threshold, and (b) causing a server to stream the selected version of the trick-play track over a network to the computing device for playout at the user interface,
wherein the data storage holds an index of the video, the index specifying a plurality of versions of the trick-play track, wherein the plurality of versions of the trick-play track differ from each other at least in terms of their respective rate of skipping I-frames of the video and thus their respective bit rate, and
wherein selecting the version of the trick-play track comprises (i) referring to the index to identify one or more of the specified plurality of versions of the trick-play track that, when played at the requested fast-play speed, would have an increased bit rate that would not exceed the network bandwidth threshold, and (ii) selecting a highest bit-rate one of the identified one or more identified versions of the trick-play track.

24. The computing device of claim 23, wherein the functions further comprise determining the network bandwidth threshold.

25. The computing device of claim 23, wherein determining the network bandwidth threshold comprises determining the network bandwidth threshold based on a rate of arrival of data at the computing device from the server.

26. The computing device of claim 23, wherein causing the server to stream the selected version of the trick-play track to the computing device comprises transmitting to the server via the network communication interface a control signal that directs the server to stream to the computing device the selected version of the trick-play track.

27. The computing device of claim 23,
wherein the data storage holds an index of the video, the index specifying a plurality of versions of the trick-play track, wherein the plurality of versions of the trick-play track differ from each other at least in terms of their respective rate of skipping I-frames of the video and thus their respective bit rate, and
wherein selecting the version of the trick-play track comprises (a) dividing the network bandwidth threshold by the requested fast-play speed to determine a maximum trick-play bit rate, and (b) selecting from the plurality of versions of the trick-play track the version that has the highest bit-rate not exceeding the determined maximum trick-play bit rate.

28. A method for controlling fast-play playout of video at a requested fast-play speed that defines a multiple of a normal playback speed of the video, the method comprising:
  determining a lowest rate at which a trick-play track of the video should skip I-frames of the video in order for the trick-play track, played at the requested fast-play speed, to have a bit rate less than or equal to a measure of network bandwidth;
  given an option for a server to stream to a client any of a plurality of different frame-rate versions of a trick-play track of the video, wherein each frame-rate version has a bit-rate that is different than the bit-rate of each other frame-rate version due at least in part to each frame-rate version skipping I-frames at a different rate than each other frame-rate version, selecting the frame-rate version that skips I-frames at the determined lowest rate; and
  causing the server to stream to the client the selected frame-rate version of the trick-play track.

29. The method of claim 28, wherein the selected frame-rate version of the trick-play track does not include any P-frames or B-frames of the video.

* * * * *